(12) United States Patent
Yamashita

(10) Patent No.: US 10,599,827 B2
(45) Date of Patent: Mar. 24, 2020

(54) INFORMATION PROCESSING SYSTEM, INFORMATION PROCESSING APPARATUS, AND INFORMATION PROCESSING METHOD

(71) Applicant: Akihiro Yamashita, Kanagawa (JP)

(72) Inventor: Akihiro Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/355,768

(22) Filed: Mar. 17, 2019

(65) Prior Publication Data

US 2019/0303554 A1 Oct. 3, 2019

(30) Foreign Application Priority Data

Mar. 29, 2018 (JP) .................................. 2018-065110

(51) Int. Cl.
*G06F 21/35* (2013.01)
*H04L 29/06* (2006.01)
*G06F 21/60* (2013.01)
*G06F 3/12* (2006.01)

(52) U.S. Cl.
CPC ............ *G06F 21/35* (2013.01); *G06F 3/1204* (2013.01); *G06F 3/1263* (2013.01); *G06F 21/608* (2013.01); *H04L 63/101* (2013.01)

(58) Field of Classification Search
CPC ...... G06F 21/35; G06F 3/1204; G06F 21/608; G06F 3/1263; H04L 63/101
USPC ........................................................ 358/1.15
See application file for complete search history.

(56) References Cited

U.S. PATENT DOCUMENTS

| | | |
|---|---|---|
| 2005/0086654 A1 | 4/2005 | Sumi et al. |
| 2008/0046553 A1 | 2/2008 | Yamashita |
| 2008/0094657 A1 | 4/2008 | Ikegami et al. |
| 2011/0066722 A1 | 3/2011 | Yamashita |
| 2011/0231581 A1 | 9/2011 | Yamashita |

(Continued)

FOREIGN PATENT DOCUMENTS

| | | |
|---|---|---|
| JP | 11-134420 | 5/1999 |
| JP | 2000-029869 | 1/2000 |

(Continued)

*Primary Examiner* — Tammy Paige Goddard
*Assistant Examiner* — Darryl V Dottin
(74) *Attorney, Agent, or Firm* — Oblon, McClelland, Maier & Neustadt, L.L.P.

(57) ABSTRACT

An information processing system includes: one or more memories that store, for each one of one or more users, a card identifier (ID) assigned to the user and character string information that is to be used for changing authority of the user to use one or more functions of the image processing apparatus, in association with each other; and one or more processors to: acquire a card ID via a network; acquire character string information via the network; authenticate the acquired card ID when the acquired card ID matches one of the card IDs stored in the one or more memories; and when the acquired character string information matches character string information that is associated with the authenticated card ID, grant authority to use one or more functions of the image processing apparatus to the user to whom the authenticated card ID is assigned, to cause the image processing apparatus to control starting of software that implements the one or more functions in accordance with the granted authority.

10 Claims, 12 Drawing Sheets

(56) References Cited

U.S. PATENT DOCUMENTS

| | | |
|---|---|---|
| 2012/0120451 A1 | 5/2012 | Ikegami et al. |
| 2013/0042181 A1 | 2/2013 | Yamashita |
| 2013/0268860 A1 | 10/2013 | Yamashita |
| 2014/0068447 A1 | 3/2014 | Yamashita |
| 2016/0105568 A1* | 4/2016 | Yamashita ......... H04N 1/00204 358/1.14 |
| 2018/0032708 A1* | 2/2018 | Mori ....................... G06F 21/31 |
| 2018/0260178 A1 | 9/2018 | Yamashita |

FOREIGN PATENT DOCUMENTS

| | | |
|---|---|---|
| JP | 2002-049614 | 2/2002 |
| JP | 2002-091982 | 3/2002 |
| JP | 2002-269077 | 9/2002 |
| JP | 2002-269078 | 9/2002 |
| JP | 2002-304389 | 10/2002 |
| JP | 2002-328843 | 11/2002 |
| JP | 2003-044479 | 2/2003 |
| JP | 2004-102935 | 4/2004 |
| JP | 2004-110227 | 4/2004 |
| JP | 2004-118705 | 4/2004 |
| JP | 2005-018279 | 1/2005 |
| JP | 2005-099949 | 4/2005 |
| JP | 2005-115920 | 4/2005 |
| JP | 2005-339580 | 12/2005 |
| JP | 2005-346352 | 12/2005 |
| JP | 2006-011668 | 1/2006 |
| JP | 2006-163839 | 6/2006 |
| JP | 2006-244093 | 9/2006 |
| JP | 2006-301858 | 11/2006 |
| JP | 2008-047070 | 2/2008 |
| JP | 2008-165725 | 7/2008 |
| JP | 2009-049470 | 3/2009 |
| JP | 2010-026707 | 2/2010 |
| JP | 2010-049364 | 3/2010 |
| JP | 2010-211523 | 9/2010 |
| JP | 2011-037161 | 2/2011 |
| JP | 2011-065273 | 3/2011 |
| JP | 2011-216074 | 10/2011 |
| JP | 2012-014292 | 1/2012 |
| JP | 2012-158176 | 8/2012 |
| JP | 2013-050915 | 3/2013 |
| JP | 2013-191238 | 9/2013 |
| JP | 2014-041591 | 3/2014 |
| JP | 2014-178908 | 9/2014 |
| JP | 2014-215984 | 11/2014 |
| JP | 2015-176238 | 10/2015 |
| JP | 2015-194984 | 11/2015 |
| JP | 2016-082332 | 5/2016 |
| JP | 2016-177551 | 10/2016 |
| JP | 2017-010243 | 1/2017 |
| JP | 2017-074716 | 4/2017 |
| JP | 2017-212737 | 11/2017 |
| JP | 2018-039205 | 3/2018 |

\* cited by examiner

| USER NAME | PASSWORD | EMAIL ADDRESS |
|---|---|---|
| tanaka | ******* | tanaka@xx.yy.zz.co.jp |
| nishida | ******* | nishida@xx.yy.zz.co.jp |
| yamada | ******* | yamada@xx.yy.zz.co.jp |
| mori | ******* | mori@xx.yy.zz.co.jp |
| saitoh | ******* | saitoh@xx.yy.zz.co.jp |
| yamashita | ******* | yamashita@xx.yy.zz.co.jp |
| ... | ... | ... |

FIG. 8

| CARD ID | CARD ATTRIBUTE | OWNER USER NAME | PIN |
|---|---|---|---|
| 123001 | EMPLOYEE | tanaka | null |
| 123002 | EMPLOYEE | nishida | null |
| 123003 | EMPLOYEE | yamada | null |
| 678001 | GUEST | mori | null |
| 678002 | GUEST | guest | 1231 |
| 678003 | GUEST | guest | null |
| ... | ... | ... | ... |

FIG. 9

| FUNCTION | AUTHORITY FOR EMPLOYEE | AUTHORITY FOR GUEST |
|---|---|---|
| COPY (MONOCHROME) | ON | ON |
| COPY (COLOR) | ON | OFF |
| PRINT (MONOCHROME) | ON | ON |
| PRINT (COLOR) | ON | ON |
| SCAN | ON | OFF |
| FAX | ON | OFF |
| ... | ... | ... |

INFORMATION PROCESSING SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2018-065110, filed on Mar. 29, 2018, in the Japan Patent Office, the entire disclosure of which is hereby incorporated by reference herein.

BACKGROUND

Technical Field

The present invention relates to an information processing system, an information processing apparatus, and an information processing method.

Description of the Related Art

In the trend of information digitization in these years, there is an increasing demand for image processing apparatuses such as a printer and a facsimile that are used for outputting digital information and a scanner that is used for digitizing documents. Such an image processing apparatus often has an image capturing function, an image forming function, a communicating function, and the like as a multifunction peripheral (MFP) that can use service of a printer, a facsimile, a scanner, a copier, and the like.

In order to increase the security level, some information processing systems perform user authentication. The information processing system allows an authenticated user to use the functions installed in an image processing apparatus. For example, authority to use the functions installed in the image processing apparatus is set for each card, so as to restrict the authority to use the functions according to attributes of the user.

SUMMARY

Example embodiments of the present invention include an information processing system, including: one or more memories that store, for each one of one or more users, a card identifier (ID) assigned to the user and character string information that is to be used for changing authority of the user to use one or more functions of the image processing apparatus, in association with each other; and one or more processors to: acquire a card ID via a network; acquire character string information via the network; authenticate the acquired card ID when the acquired card ID matches one of the card IDs stored in the one or more memories; and when the acquired character string information matches character string information that is associated with the authenticated card ID, grant authority to use one or more functions of the image processing apparatus to the user to whom the authenticated card ID is assigned, to cause the image processing apparatus to control starting of software that implements the one or more functions in accordance with the granted authority.

The information processing system may be implemented by at least an information processing apparatus.

Example embodiments include an information processing method performed by the information processing system, and a recording medium storing a control program for causing the information processing system to perform the information processing method.

BRIEF DESCRIPTION OF THE SEVERAL VIEWS OF THE DRAWING

A more complete appreciation of the disclosure and many of the attendant advantages and features thereof can be readily obtained and understood from the following detailed description with reference to the accompanying drawings, wherein:

FIG. 8 is an illustration of a data structure of card information according to the embodiment of the present invention;

FIG. 9 is an illustration of a data structure of authority information according to the embodiment of the present invention;

Figure 1:
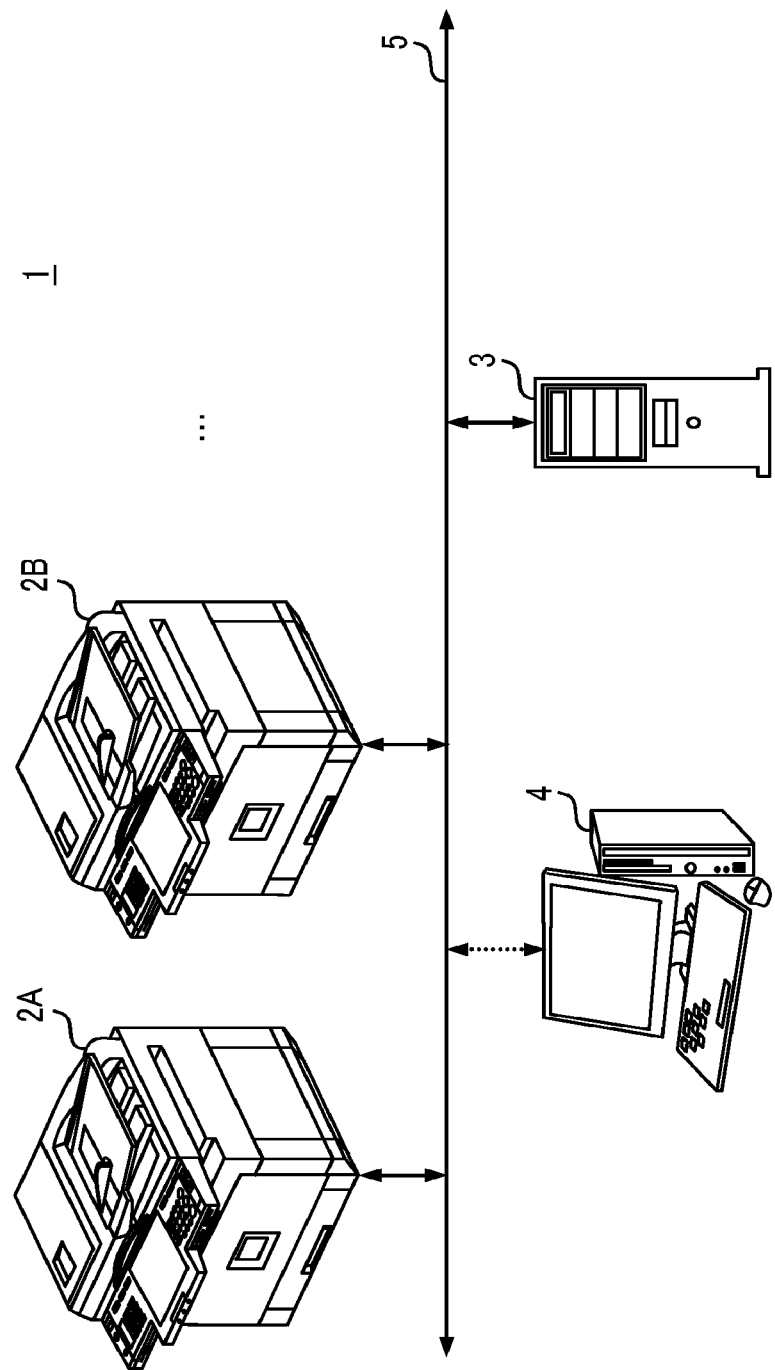
FIG. 1 illustrates an application mode of an information processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, an embodiment of the present invention will be described below in detail with reference to the drawings. In this embodiment, an information processing system 1 will be described. The information processing system 1 includes a computer resource provided by an image processing apparatus and cloud computing. Examples of the image processing apparatus include a multifunction peripheral (MFP) that executes a scan function, a print function, an email sending function, and the like, and a printer.

FIG. 1 illustrates an example of an application of the information processing system 1 according to this embodiment. As illustrated in FIG. 1, the information processing system 1 includes a plurality of image processing apparatuses 2A and 2B, a server 3, and a personal computer (PC) 4 connected via a network 5. In the following description, the image processing apparatuses 2A and 2B will be described as an image processing apparatus 2 when they are not distinguished from one another. In this embodiment, the number of image processing apparatuses 2 may be less than or more than the number illustrated in FIG. 1.

The image processing apparatus 2 is an MFP having an image capturing function, an image forming function, a communicating function, and the like so as to be used as a printer, a facsimile, a scanner, and a copier.

The image processing apparatus 2 has a function of a color printer or a monochrome printer, and generates CMYK or monochrome depiction information based on image data and forms an image based on the generated depiction information for output.

Furthermore, software for generating document data based on an image read by a scanner is installed in the image processing apparatus 2. The image processing apparatus 2 transmits and receives data to and from another image processing apparatus 2, the server 3, and the PC 4 via the network 5.

Figure 3:
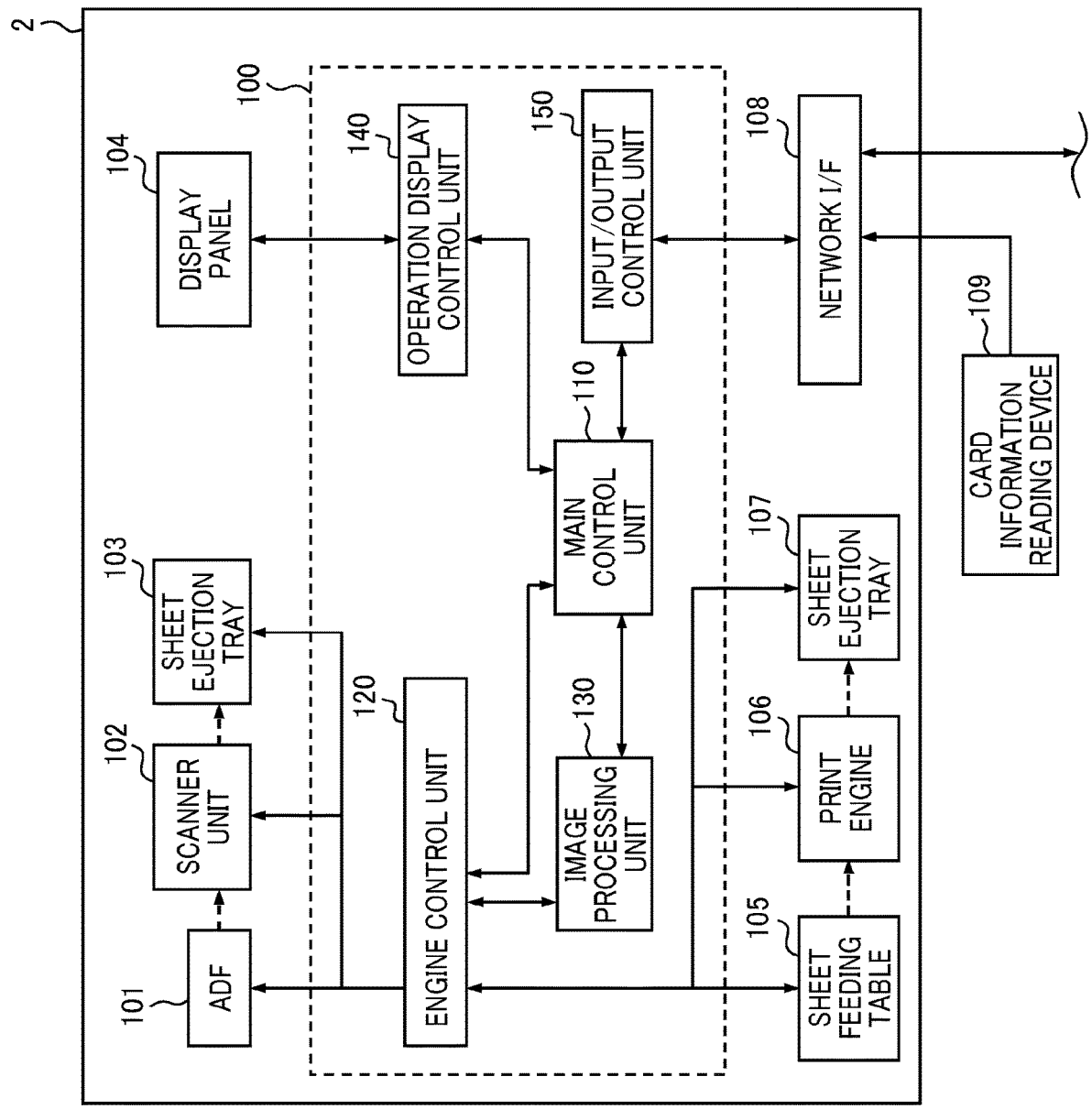
FIG. 3 is a block diagram illustrating a functional configuration of a controller of the image processing apparatus according to the embodiment of the present invention.

The server 3 functions as an authentication apparatus that authenticates a user based on a card ID acquired by the image processing apparatus 2 through a card information reading device 109 (see FIG. 3). In addition, the server 3 stores authority information for each authenticated user. The authority information indicates authority to use one or more functions selected from among the functions installed in the image processing apparatus 2. The authority information of a user authenticated by the server 3 is transmitted to the image processing apparatus 2 via the network 5.

The card ID in this embodiment is information stored in a storage medium such as an IC card or information obtained by decoding an encoding figure such as a QR code (registered trademark).

The PC 4 is a client terminal operated by a manager (administrator) who manages the information processing system 1. For example, the PC 4 instructs the server 3 to store authentication information and authority information of users who use the information processing system 1. In addition, the PC 4 requests the server 3 to issue a personal identification number (PIN) for expanding the authority to use the functions installed in the image processing apparatus 2 for a guest user who temporarily uses the information processing system 1.

With such a configuration, the information processing system 1 according to this embodiment changes the authority to use the functions installed in the image processing apparatus 2 in accordance with the user's attribute.

Figure 2:
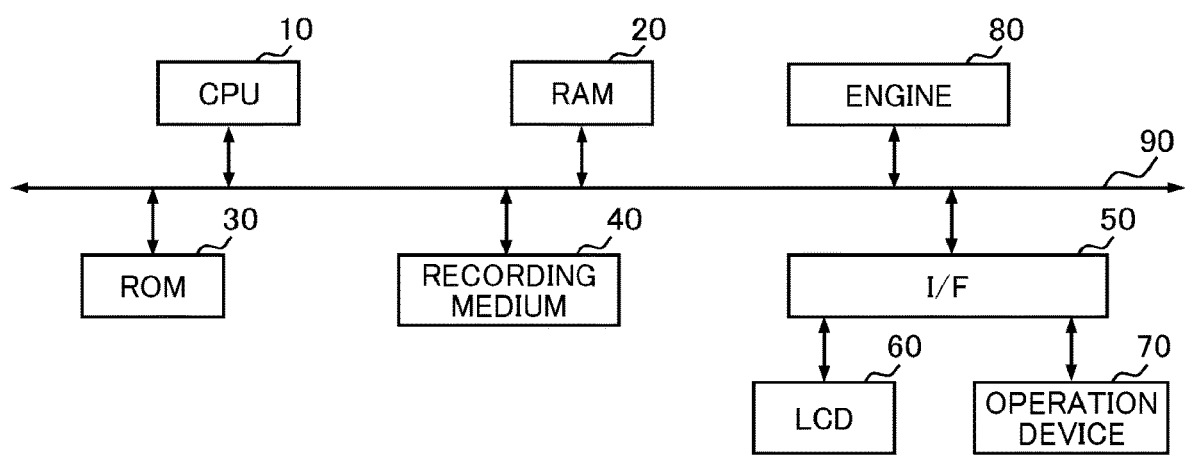
FIG. 2 is a block diagram illustrating a hardware configuration of an image processing apparatus according to the embodiment of the present invention.

Next, a hardware configuration of an information processing apparatus such as the image processing apparatus 2 according to this embodiment will be described with reference to FIG. 2. FIG. 2 is a block diagram illustrating the hardware configuration of a controller of the image processing apparatus 2 according to this embodiment.

The controller of the image processing apparatus 2 according to this embodiment has substantially the same configuration as a general-purpose PC or an information processing apparatus such as hardware that implements the server 3 and the PC 4. The image processing apparatus 2 according to this embodiment includes a central processing unit (CPU) 10, a random access memory (RAM) 20, a read-only memory (ROM) 30, a recording medium 40 such as a hard disk drive (HDD), and an interface (I/F) 50, which are connected to each other via a bus 90.

In addition to the above components, the image processing apparatus 2 further includes an engine 80 that provides functions specific to the image processing apparatus 2, such as the functions as a scanner, a printer, and the like. The image processing apparatus 2 further includes a display such as a liquid crystal display (LCD) 60 and an operation device 70 such as a keyboard, which are connected through the I/F 50.

The CPU 10 is a computing device and controls entire operation of the image processing apparatus 2. The RAM 20 is a high-speed readable/writable volatile storage medium and is used as a work area for the CPU 10 to perform image processing, for example. The ROM 30 is a read-only non-volatile storage medium, in which a program of firmware or the like is stored. The recording medium 40 is a readable/writable non-volatile storage medium such as an HDD, in which an operating system (OS), various controls programs, application programs (hereinafter, applications), and the like are stored. The I/F 50 connects and controls the bus 90, hardware components such as the LCD 60 and the operation device 70, the network 5, and the like.

The LCD 60 is a user interface on which a user checks the state of the image processing apparatus 2 received through the IN 50. The operation device 70 is a user interface such as a keyboard or the like and used by the user to input information to the image processing apparatus 2. The LCD 60 and the operation device 70 may be configured as a touch panel using a resistive film, a surface acoustic wave, a capacitance, or the like as an operation principle.

In the above hardware configuration, the CPU 10 performs computation processing in accordance with a program stored in the ROM 30 or a program read from the recording medium 40 to the RAM 20, such that the functions of a controller 100, which will be described later with reference to FIG. 3, are implemented. The functions of the controller 100 and hardware configured in the above manner are combined to form functional blocks that implement the functions of the image processing apparatus 2.

The server 3 has a hardware configuration that is substantially similar to the hardware configuration described above referring to FIG. 2, except that the engine 80 may not be provided. Specifically, the CPU 10 performs computation according to programs, which are read from the ROM 30, the recording medium 40, or a recording medium such as an optical disk, onto the RAM 20, to implement various functions of a controller 300 (see FIG. 5). The functions of the controller 300 and hardware configured in the above manner are combined to form functional blocks that implement the functions of the server 3.

The PC 4 has a hardware configuration that is substantially similar to the hardware configuration described above referring to FIG. 3, except that the engine 80 may not be provided. Specifically, the CPU 10 performs computation according to programs, which are read from the ROM 30, the recording medium 40, or a recording medium such as an optical disk, onto the RAM 20, to implement various functions of the PC 4. The functions, which are controlled by software, and hardware configured in the above manner are combined to form functional blocks that implement the functions of the PC 4.

Next, a configuration of the image processing apparatus 2 according to this embodiment will be described with reference to FIG. 3. FIG. 3 is a block diagram illustrating the functional configuration of the controller 100 of the image processing apparatus 2, and hardware that operates under control of the controller 100, according to this embodiment. As illustrated in FIG. 3, the image processing apparatus 2 includes the controller 100, an auto document feeder (ADF) 101, a scanner unit 102, a sheet ejection tray 103, a display panel 104, a sheet feeding table 105, a print engine 106, a sheet ejection tray 107, and a network I/F 108. In addition to this configuration, the image processing apparatus 2 is connected to the card information reading device 109 through the network I/F 108.

The controller 100 includes a main control unit 110, an engine control unit 120, an image processing unit 130, an operation display control unit 140, and an input/output control unit 150. Note that FIG. 3 illustrates electrical connections by using solid arrows and flow of a document or a bundle of documents by using dashed arrows.

The network I/F 108 is an interface used for the image processing apparatus 2 to communicate with another apparatus via the network, and is Ethernet (registered trademark) or a universal serial bus (USB) interface in this example. The network I/F 108 can perform communication based on the transmission control protocol/Internet protocol (TCP/IP), and is implemented by the I/F 50 illustrated in FIG. 2. In addition, through the network I/F 108, the image processing apparatus 2 acquires the card ID that has been read by the card information reading device 109.

The controller 100 is configured by combination of software and hardware. Specifically, the controller 100 is configured by software executed by the CPU 10 (which is hardware), and/or hardware such as an integrated circuit. For example, a program stored in the ROM 30, a non-volatile memory, or the non-volatile recording medium 40 such as an optical disk is loaded to a volatile memory such as the RAM 20 (hereinafter, memory), and the CPU 10 operates in accordance with the program. The controller 100 controls the entirety of the image processing apparatus 2.

The main control unit 110 controls various units (functions) included in the controller 100 by sending instructions to other units of the controller 100. That is, the main control unit 110 controls the units in the controller 100 to control the functions of a copier, a printer, a scanner, and a facsimile, in the image processing apparatus 2.

The engine control unit 120 serves a driving unit that controls or drives the print engine 106, the scanner unit 102, and the like. Under control of the main control unit 110, the image processing unit 130 generates depiction information based on image information that is to be printed. The depiction information herein is information used to depict an image that is to be formed by the print engine 106 in an image forming operation.

The image processing unit 130 processes captured-image data that has been input from the scanner unit 102 to generate image data. The image data obtained through a scanner operation is stored in a storage area of the image processing apparatus 2 and is transmitted to another information processing terminal or storage apparatus through the network I/F 108.

The operation display control unit 140 displays information on the display panel 104 or transmits, to the main control unit 110, information that has been input through the display panel 104. The input/output control unit 150 outputs, to the main control unit 110, information that has been input through the network I/F 108. In addition, the main control unit 110 controls the input/output control unit 150 and accesses another apparatus that is connected to the network through the network I/F 108.

In a case where the image processing apparatus 2 operates as a printer, first, the input/output control unit 150 receives a print job through the network OF 108. That is, the input/output control unit 150 acquires print data. The input/output control unit 150 transfers the received print job to the main control unit 110. Upon reception of the print job, the main control unit 110 controls the image processing unit 130 to generate depiction information based on document information or image information included in the print job.

Upon generation of the depiction information by the image processing unit 130, the engine control unit 120 controls the print engine 106, and based on the generated depiction information, causes an image to be formed on a sheet conveyed from the sheet feeding table 105. That is, the image processing unit 130, the engine control unit 120, and the print engine 106 collectively performs prinitng.

As specific embodiments of the print engine 106, an image forming mechanism using an ink-jet method, an image forming mechanism using an electrophography method, or the like can be used. A document on which the image is formed by the print engine 106 is ejected to the sheet ejection tray 107.

In a case where the image processing apparatus 2 operates as a scanner, in accordance with a user operation on the display panel 104 or a scan execution instruction that has been input from an external apparatus through the network I/F 108, the operation display control unit 140 or the input/output control unit 150 transfers a scan execution signal to the main control unit 110. Based on the received scan execution signal, the main control unit 110 controls the engine control unit 120.

The engine control unit 120 drives the ADF 101 to convey, to the scanner unit 102, a document that is set on the ADF 101 as an image capturing target, as described above. In addition, the engine control unit 120 drives the scanner unit 102 to capture an image of (scans) the document conveyed from the ADF 101.

In a case where no document has been set on the ADF 101 and a document is directly set in the scanner unit 102, under control of the engine control unit 120, the scanner unit 102 captures an image of the set document. That is, the scanner unit 102 performs image capturing, and the engine control unit 120 performs reading control.

During the image capturing operation, an image sensor such as a charge-coupled device (CCD) included in the scanner unit 102 optically scans the document, and captured image information is generated based on the optical information. The engine control unit 120 transfers the captured image information generated by the scanner unit 102 to the image processing unit 130. Under control of the main control unit 110, the image processing unit 130 generates image information based on the captured image information received from the engine control unit 120.

The main control unit 110 acquires the image information generated by the image processing unit 130 and stores the information in a storage medium such as the recording medium 40 that is attached to the image processing apparatus 2. That is, the scanner unit 102, the engine control unit 120, and the image processing unit 130 together operate to perform inputting of image. The image information generated by the image processing unit 130 is, in accordance with a user's instruction, directly stored in the recording medium 40 or the like or is transmitted to an external apparatus through the input/output control unit 150 and the network I/F 108.

In a case where the image processing apparatus 2 operates as a copier, based on captured image information received by the engine control unit 120 from the scanner unit 102 or image information generated by the image processing unit 130, the image processing unit 130 generates depiction information. Based on the depiction information, as in the case of the printer operation, the engine control unit 120 drives the print engine 106. If the depiction information and the captured image information have the same information format, the captured image information can also be used directly as the depiction information.

The image processing apparatus 2 according to this embodiment controls starting of applications that implement the functions installed in the image processing apparatus 2 based on authority information received from the server 3. The starting of applications is controlled by the main control unit 110. Next, a configuration of the main control unit 110 according to this embodiment will be described with reference to FIG. 4.

Figure 4:
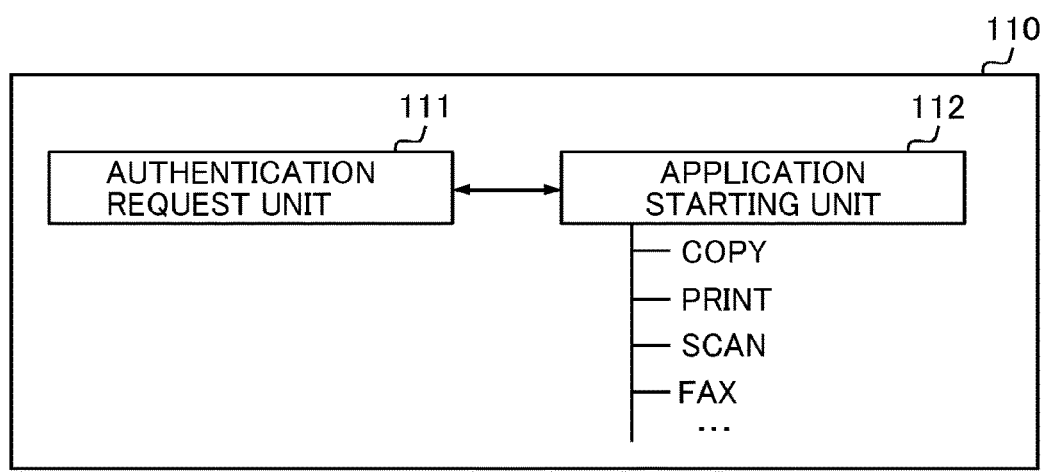
FIG. 4 is a block diagram illustrating a functional configuration of a main control unit according to the embodiment of the present invention.

As illustrated in FIG. 4, the main control unit 110 includes an authentication request unit 111 and an application starting unit 112. The authentication request unit 111 transmits, to the server 3, card information including a card ID and the like received from the card information reading device 109, and requests user authentication. The application starting unit 112 controls starting of application software that implements the functions of a copier, a printer, a scanner, and a facsimile, which are provided in the image processing apparatus 2, according to the authority information received from the server 3.

Upon reception of the authentication request, based on the card ID and the card information, the server 3 performs user authentication and transmits, to the image processing apparatus 2, information of authority to use the image processing apparatus 2, which is granted to the authenticated user. That is, the server 3 transmits the authority information to the image processing apparatus 2, and the authority information is information of applications that implement the functions of a copier, a printer, a scanner, and a facsimile, installed in the image processing apparatus 2 and available by the authenticated user.

Figure 5:
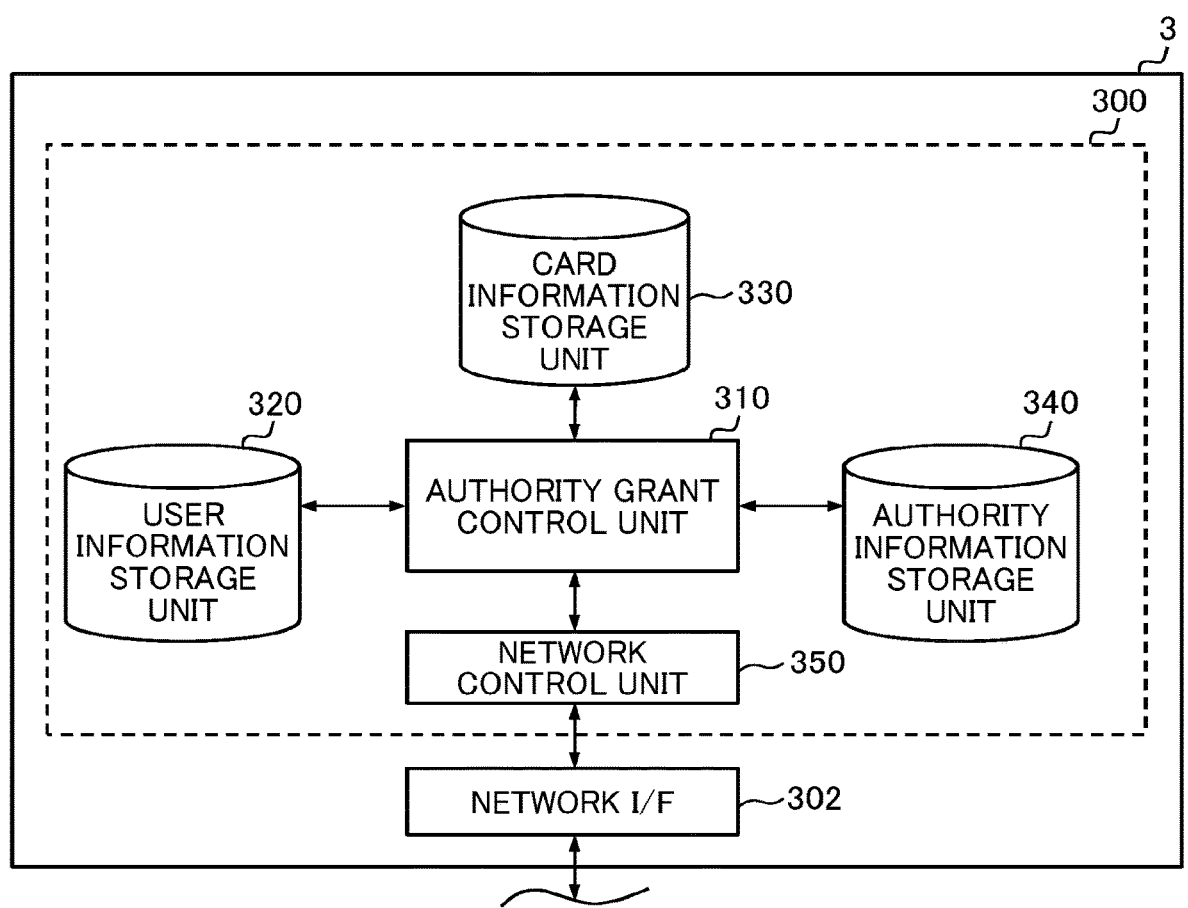
FIG. 5 is a block diagram illustrating a functional configuration of a server according to the embodiment of the present invention.

Next, a functional configuration of the server 3 according to this embodiment will be described with reference to FIG. 5. FIG. 5 is a block diagram illustrating the functional configuration of the server 3 according to this embodiment. As illustrated in FIG. 5, the server 3 according to this embodiment includes the controller 300 and a network I/F 302. The controller 300 includes an authority grant control unit 310, a user information storage unit 320, a card information storage unit 330, an authority information storage unit 340, and a network control unit 350.

The network I/F 302 is an interface used for the server 3 to communicate with another apparatus via a network and is Ethernet (registered trademark) or a USB interface. The network I/F 302 is implemented by the I/F 50 illustrated in FIG. 2.

The controller 300 is configured by combination of software and hardware. Specifically, the controller 300 is implemented by software executed by the CPU 10 (hardware), and/or hardware such as an integrated circuit. For example, a program stored in the ROM 30, a non-volatile memory, or a non-volatile storage medium such as the recording medium 40 or an optical disk is loaded to a volatile memory such as the RAM 20, and the CPU 10 operates in accordance with the program. The controller 300 controls the entirety of the server 3 and implements functions as described below.

Figures 6, 7:
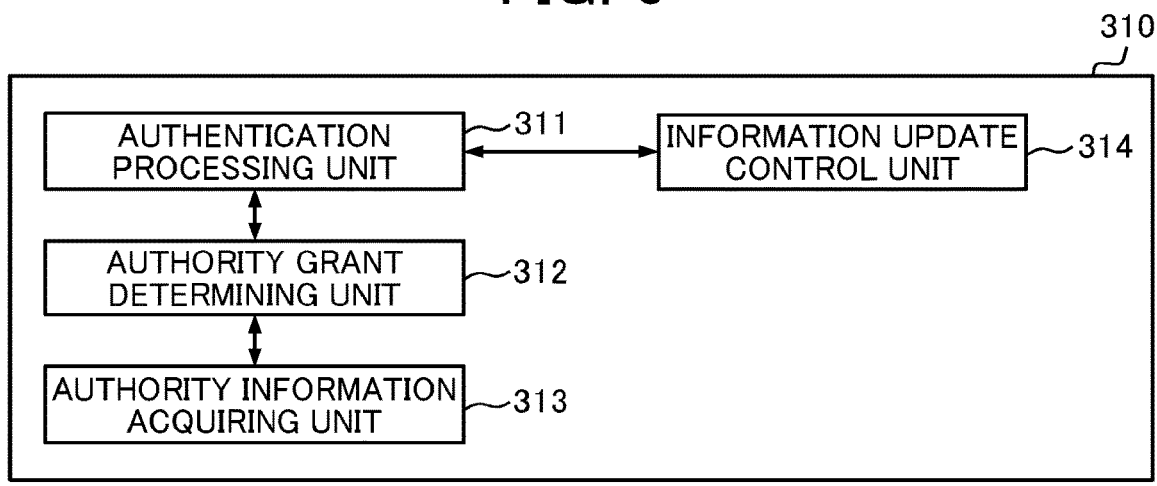
FIG. 6 is a block diagram illustrating a functional configuration of an authority grant control section according to the embodiment of the present invention.
FIG. 7 is an illustration of a data structure of user information according to the embodiment of the present invention.

The authority grant control unit 310 authenticates a user in response to an authentication request from the image processing apparatus 2, and performs processing for granting, to the authenticated user, authority to use the functions installed in the image processing apparatus 2. As illustrated in FIG. 6, the authority grant control unit 310 includes an authentication processing unit 311, an authority grant determining unit 312, an authority information acquiring unit 313, and an information update control unit 314.

The authentication processing unit 311 determines whether a card ID received from the image processing apparatus 2 is stored in the card information storage unit 330. In addition, the authentication processing unit 311 requests the image processing apparatus 2 to input a PIN that is stored in association with the card ID.

The authority grant determining unit 312 determines whether a character string that has been input through a user operation on the display panel 104 of the image processing apparatus 2 corresponds to the PIN stored in the card information storage unit 330.

Based on information of a card attribute stored in the card information storage unit 330, the authority information acquiring unit 313 acquires, from the authority information storage unit 340, information indicating the authority to use the functions installed in the image processing apparatus 2.

If the character string that has been input through a user operation on the display panel 104 of the image processing apparatus 2 corresponds to the PIN stored in the card information storage unit 330, in accordance with the input PIN, the authority information acquiring unit 313 acquires, from the authority information storage unit 340, the information indicating the authority to use the functions installed in the image processing apparatus 2.

The information update control unit 314 updates an owner user name that is stored in the card information storage unit 330 in association with the card ID. In addition, the information update control unit 314 generates a PIN in association with the card ID, and updates card information in such a manner that the generated PIN is stored in association with the card ID that is stored in the card information storage unit 330.

If, for example, information for requesting setting of a new card attribute or information for requesting addition of authentication information is received from the PC 4, based on such information, the information update control unit 314 updates information stored in the user information storage unit 320, the card information storage unit 330, and the authority information storage unit 340.

The user information storage unit 320, which is implemented by the CPU 10 and any desired memory, stores notification address information including a user name, a password, and an email address, as identification information with which the user can be identified. As illustrated in FIG. 7, the user information storage unit 320 stores user names, passwords, and email addresses. Each of the passwords is a character string set for a corresponding one of the user names, and each of the email addresses is assigned to a corresponding user.

As illustrated in FIG. 8, the card information storage unit 330, which is implemented by the CPU 10 and any desired memory, stores card information that is information in which the card ID, the card attribute, the owner user name, and the PIN are associated with one another. The card ID is information stored in an IC card or the like that is placed over the card information reading device 109 by the user, and a unique ID is assigned to each card.

The card attribute is granted to the user who owns the card corresponding to the card ID. The card attribute is attribute information indicating, among the functions installed in the image processing apparatus 2, functions for which authority to use is granted. Although "employee" and "guest" are illustrated as examples in FIG. 8 as the card attributes, for example, other attributes such as "manager" and "temporary guest" may be assigned so as to expand or reduce the authority to use the functions installed in the image processing apparatus 2.

The owner user name is information indicating the name of a user to whom the card corresponding to the card ID is assigned. The PIN is character string information containing numerical digits that is uniquely assigned to the card ID whose the card attribute is other than "employee". The PIN is information used for changing the authority to use the functions installed in the image processing apparatus 2, the authority having been assigned in advance to each card attribute.

As illustrated in FIG. 9, the authority information storage unit 340, which is implemented by the CPU 10 and any desired memory, stores the authority information, which is information indicating the authority to use the functions installed in the image processing apparatus 2, the authority having been assigned to each card attribute. In FIG. 9, in a case where the card attribute is a second attribute, "employee", the authority to use the functions installed in the image processing apparatus 2 is as follows: "copy (monochrome): ON", "copy (color): ON", "print (monochrome): ON", "print (color): ON", "scan: ON", and "FAX: ON".

In FIG. 9, in a case where the card attribute is a first attribute, "guest", the authority to use the functions installed in the image processing apparatus 2 is as follows: "copy (monochrome): ON", "copy (color): OFF", "print (monochrome): ON", "print (color): ON", "scan: OFF", and "FAX: OFF".

The network control unit 350 acquires information that has been input through the network I/F 302 and transmits the information to another apparatus through the network I/F 302.

With this configuration, in the information processing system 1 according to this embodiment, processing is performed for allowing a user who is authenticated by user authentication to use the functions installed in the image processing apparatus 2. Further, the functions of the image processing apparatus 2 that can be used by the authenticated user are changed in accordance with the user's attribute.

Figure 10:
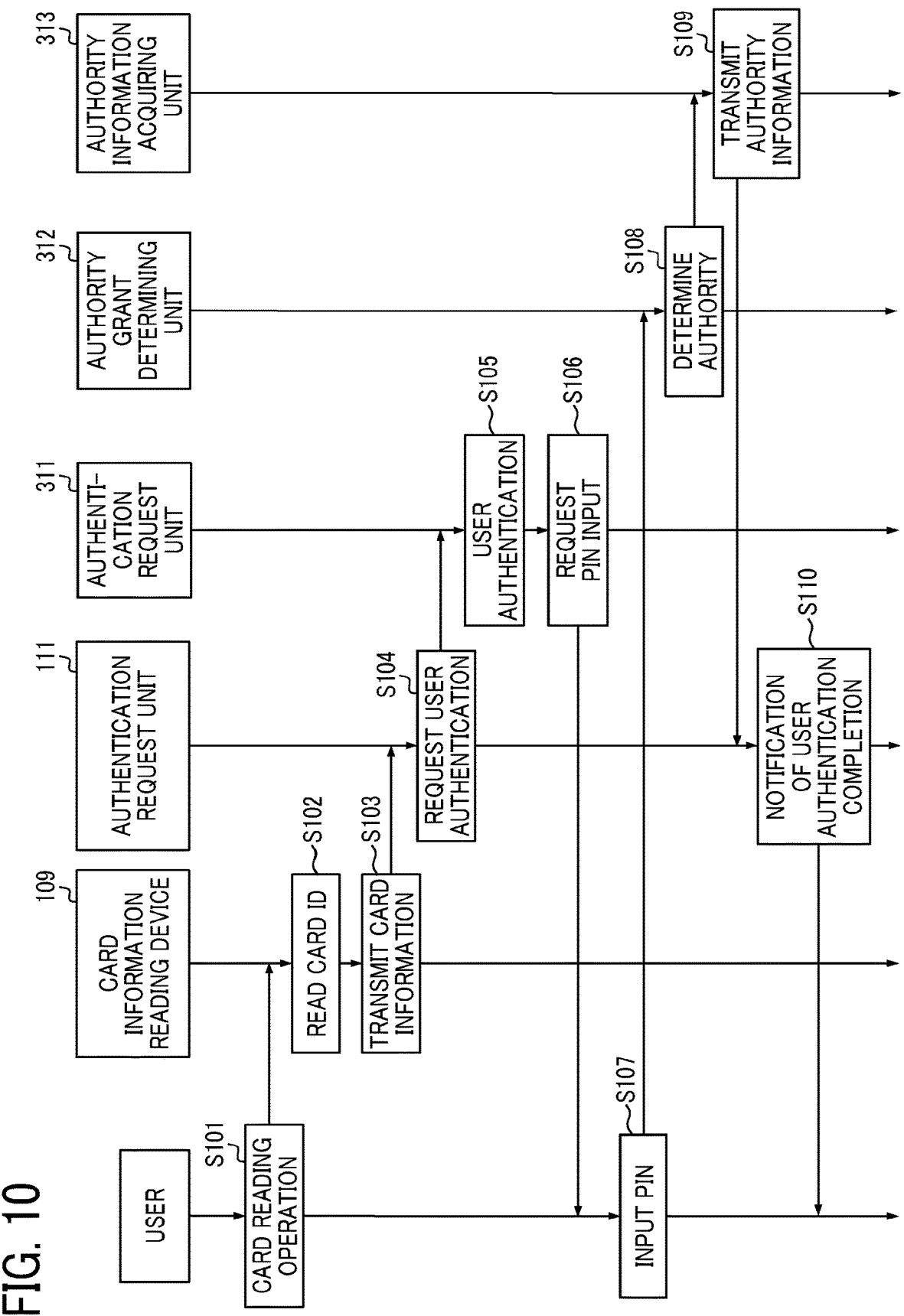
FIG. 10 is a sequence diagram illustrating process flow for granting authority to use the image processing apparatus according to the embodiment of the present invention.

Next, process flow for making available the functions installed in the image processing apparatus 2 according to this embodiment will be described with reference to FIG. 10. FIG. 10 is a sequence diagram illustrating process flow for granting authority to use the functions installed in the image processing apparatus 2 according to this embodiment.

First, a user places an IC card close to the card information reading device 109 so as to let the card information reading device 109 read a card ID stored in the IC card (S101). The card information reading device 109 reads the card ID (S102) and outputs the read card ID to the authentication request unit 111 (S103).

The authentication request unit 111 transmits the input card ID and a user authentication request to the authentication processing unit 311 in the server 3 (S104). Subsequently, the authentication processing unit 311 performs user authentication to determine whether a card ID that corresponds to the received card ID is stored in the card information storage unit 330 and the received card ID is authenticated (S105). In this embodiment, the authentication processing unit 311 acquires card information and authenticates using the card information.

If the card ID that corresponds to the received card ID is stored in the card information storage unit 330 and the user authentication is successful, the authentication processing unit 311 transmits a PIN input request to the image processing apparatus 2 (S106)

If the received card ID is not stored in the card information storage unit 330 and the user authentication fails, the authentication processing unit 311 ends this process.

In a case where no PIN is set in card information that is stored in association with the received card ID, the authentication processing unit 311 does not transmit a PIN input request, and continues the sequence. This is because, as illustrated in FIG. 8, no PIN is set in card information in which the card attribute is "employee" in this embodiment.

Accordingly, in a case where the PIN input request is transmitted in S106, in the card information of the card read by the card information reading device 109, a PIN that is to be input by the user is set. That is, in this embodiment, the user having the card whose card attribute is "employee" can use the functions installed in the image processing apparatus 2 without inputting the PIN.

Upon reception of the PIN input request, the image processing apparatus 2 causes the operation display control unit 140 to display an input screen for inputting the PIN on the display panel 104. The user performs an operation of inputting a character string in accordance with the input screen (S107). The character string that has been input by the user is transmitted by the input/output control unit 150 to the authority grant determining unit 312 in the server 3. The authority grant determining unit 312 thus acquires character string information.

Upon reception of information of the character string that has been input by the user, the authority grant determining unit 312 determines whether the character string that has been input by the user corresponds to a PIN stored in the card information storage unit 330 (S108). The determination result is transmitted to the authority information acquiring unit 313.

An example of the determination result will be described by taking the example illustrated in FIG. 8 in which the card ID with which user authentication has been performed in S105 is "678002". If the character string that has been input by the user is "1231", the authority grant determining unit 312 determines in S107 that the character string that has been input by the user corresponds to the PIN stored in the card information storage unit 330.

If it is determined that the character string that has been input by the user corresponds to the PIN stored in the card information storage unit 330, the authority information acquiring unit 313 refers to the authority information storage unit 340 to acquire authority information that is assigned to the card attribute "employee". Subsequently, the authority information acquiring unit 313 acquires the authority information that is assigned to the card attribute "employee" from the authority information storage unit 340, and transmits the authority information together with the card information to the authentication request unit 111 (S109).

Upon acquisition of the authority information and the card information, the authentication request unit 111 notifies the application starting unit 112 of the authority information. Subsequently, the authentication request unit 111 displays a screen indicating the completion of user authentication on the display panel 104 (S110), and the process ends.

If the character string that has been input by the user corresponds with no PIN stored in the card information storage unit 330, or if the user inputs no character string, the authority information acquiring unit 313 refers to the authority information storage unit 340 to acquire authority information that is assigned to the card attribute "guest", acquires the authority information that is assigned to the card attribute "guest", and transmits the authority information together with the card information to the authentication request unit 111.

Subsequently, on the image processing apparatus 2 after user authentication, a screen on which use of the functions installed in the image processing apparatus 2 is restricted, in other words, a screen indicating available functions of the image processing apparatus 2, is displayed for each authenticated user who is the user of the information processing system 1.

Figure 11:
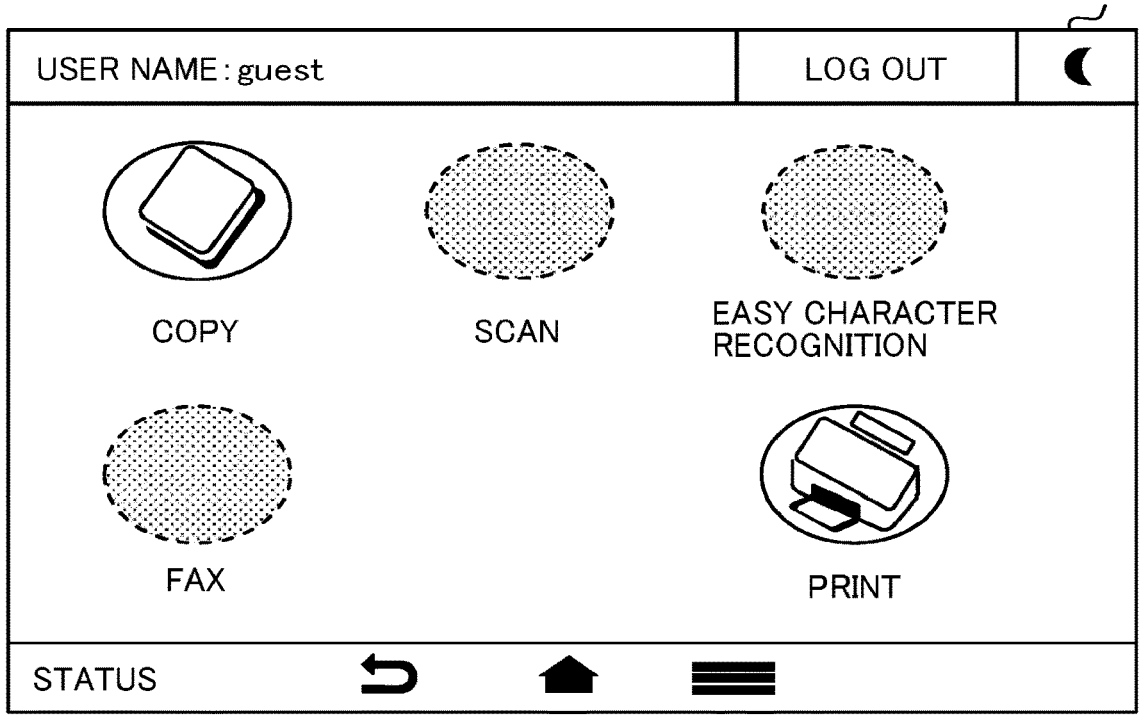
FIG. 11 illustrates an example of a screen displayed on the image processing apparatus according to the embodiment of the present invention.
Figure 12:
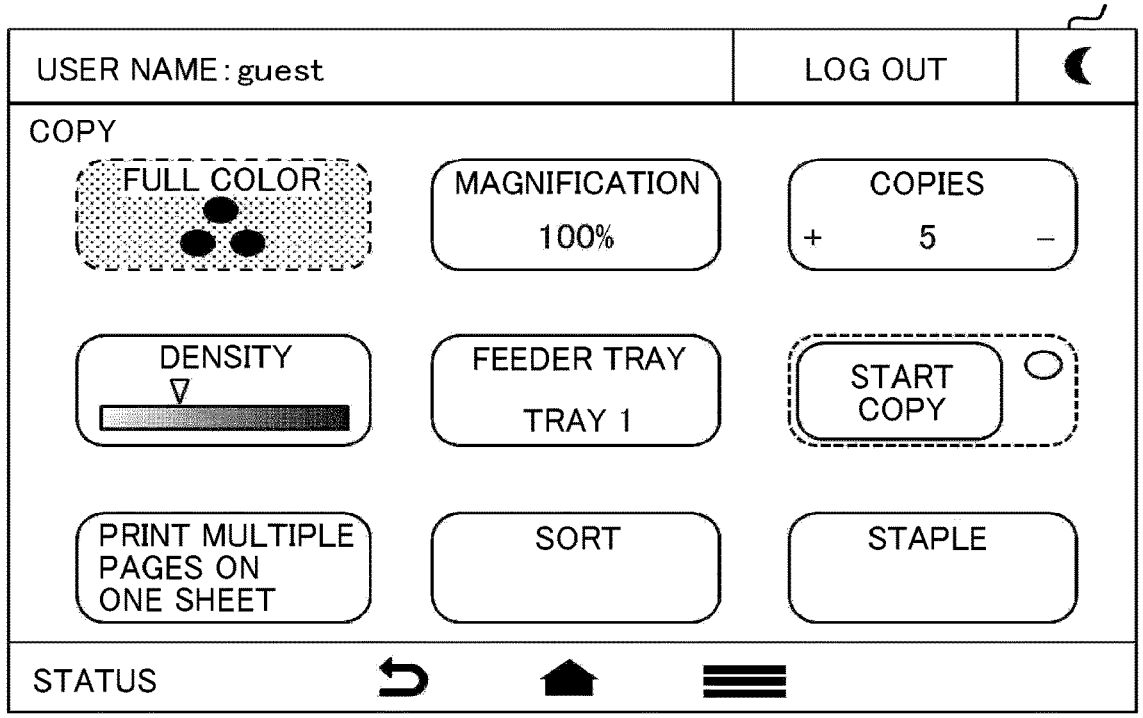
FIG. 12 illustrates an example of a screen displayed on the image processing apparatus according to the embodiment of the present invention.

For example, as illustrated in FIGS. 11 and 12, on screens 712 and 713 that are displayed before user authentication, "copy (monochrome)", "print", and "print (color)" are available, but "copy (color)", "scan", and "FAX" are displayed in grey, indicating that these functions are unavailable even if these icons are pressed.

Thus, the user is allowed to use "copy (monochrome)", "print", and "print (color)", but is not allowed to use "copy (color)", "scan", and "FAX".

Figure 13:
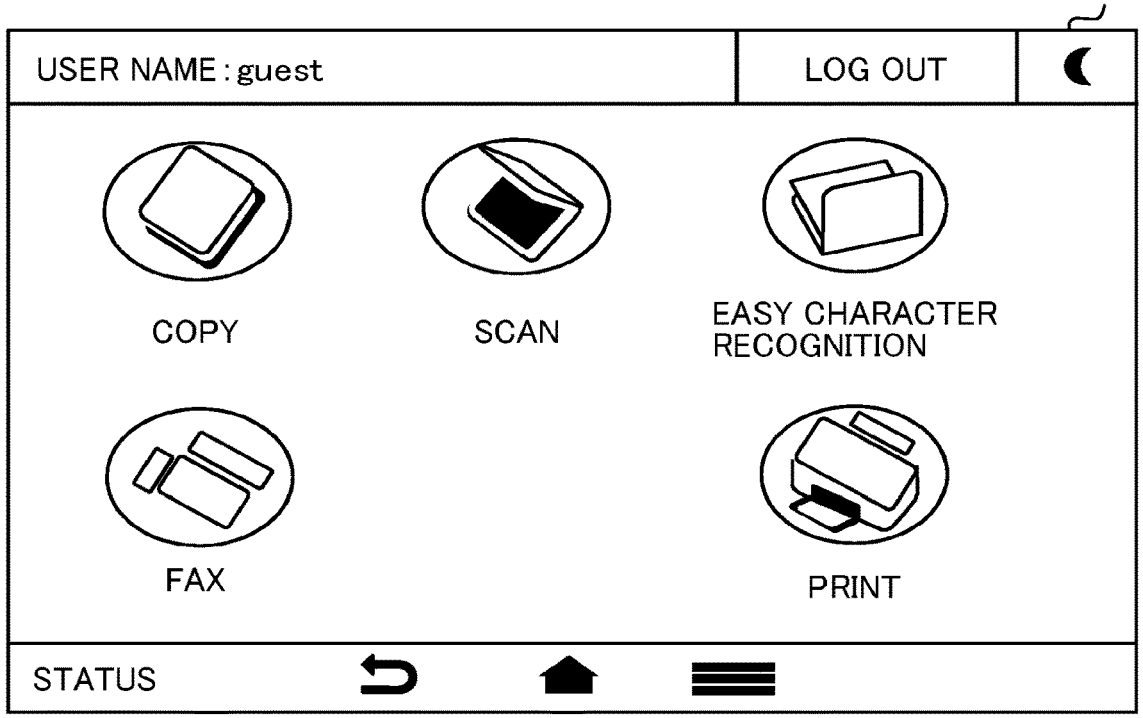
FIG. 13 illustrates an example of a screen displayed on the image processing apparatus according to the embodiment of the present invention.
Figure 14:
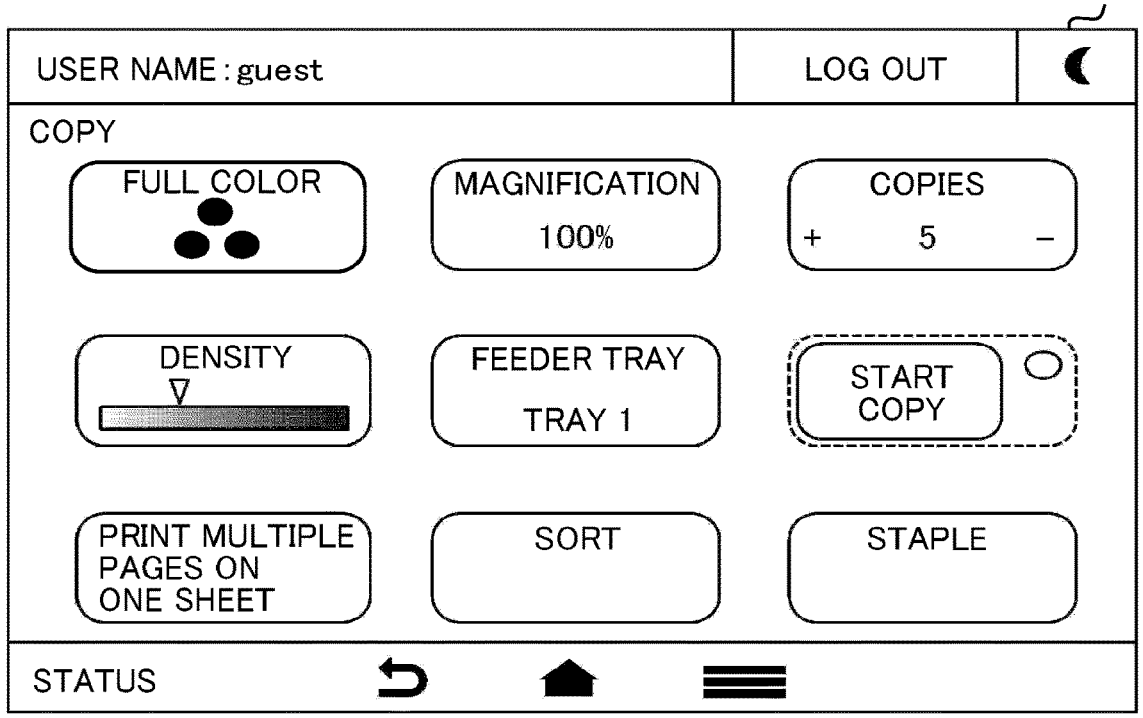
FIG. 14 illustrates an example of a screen displayed on the image processing apparatus according to the embodiment of the present invention.

After the process in FIG. 10, as illustrated in FIGS. 13 and 14, on screens 714 and 715 that are displayed after user authentication, all of the functions "copy (monochrome)", "print", "print (color)", "copy (color)", "scan", and "FAX" are displayed as being available.

In the above manner, in the information processing system 1 according to this embodiment, if the character string that has been input by the user whose card ID has been authenticated corresponds to the preset PIN, the authority to use the functions installed in the image processing apparatus 2 can be expanded. Accordingly, the user convenience when using the image processing apparatus 2 can be increased without reissuing an IC card.

Figure 15:
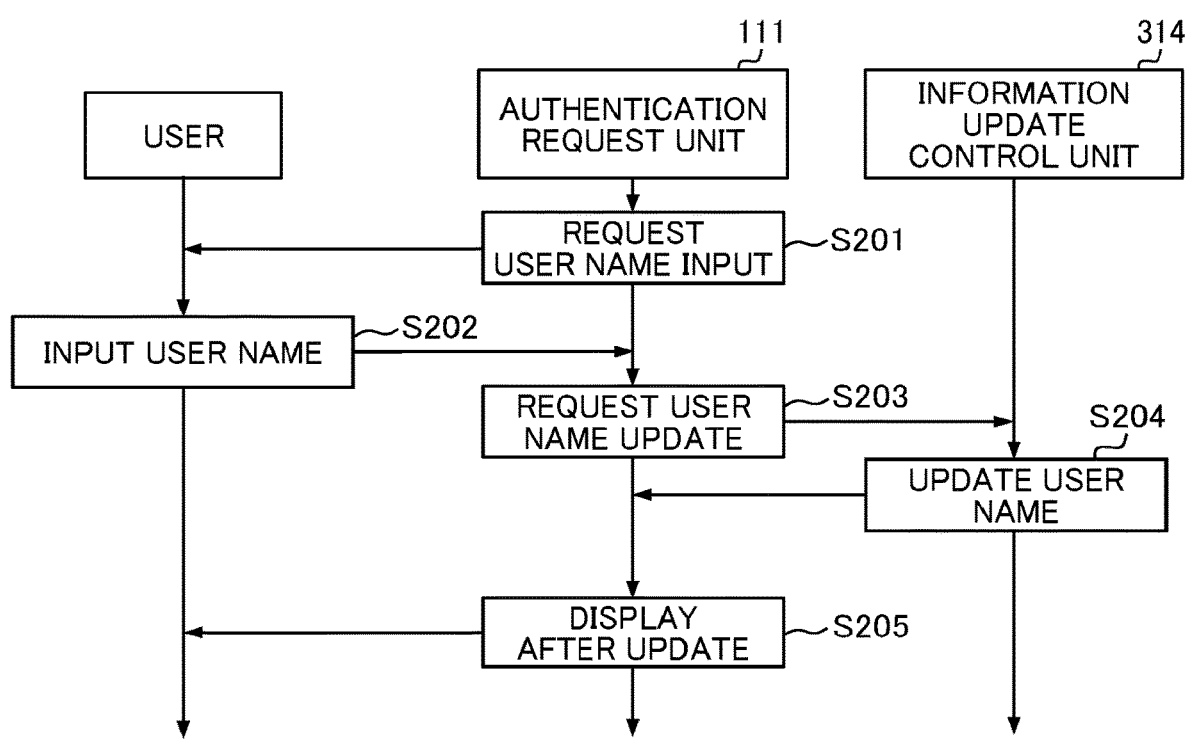
FIG. 15 is a sequence diagram illustrating process flow for updating an owner user name according to the embodiment of the present invention.

Next, a process for updating an owner user name in association with a card ID after user authentication will be described with reference to FIG. 15. FIG. 15 is a sequence diagram illustrating process flow for updating the owner user name according to this embodiment.

Note that the process described with reference to FIG. 15 is performed in the information processing system 1 in which, by using a card whose card ID is not stored in association with an owner user name, user authentication is completed in the process described with reference to the sequence diagram in FIG. 10 and the image processing apparatus 2 becomes available. Thus, the process in FIG. 15 will be described on the assumption that the process in FIG. 10 is performed by using an IC card whose card ID is "123003" in the card information in FIG. 8.

In the process described with reference to FIG. 10, in some cases, the authentication request unit 111 receives card information that does not include "owner user name", which is information of a name, from the authority information acquiring unit 313. For example, if the process in FIG. 10 is performed by using the IC card whose card ID is "123003" in FIG. 8, the authentication request unit 111 receives card information that does not include "owner user name", in other words, "owner user name" is yet to be registered, from the authority information acquiring unit 313.

In such a case, the authentication request unit 111 causes an input screen for inputting the owner user name to be displayed on the display panel 104 (S201). The user inputs the owner user name in accordance with the input screen (S202). It is assumed that "yamada" is input in S202.

The authentication request unit 111 transmits, together with the card ID with which user authentication has been performed, a request for updating the card information stored in the card information storage unit 330 such that the owner user name that has been input through the operation display control unit 140 is stored in the card information (S203).

Upon reception of the updating request, the information update control unit 314 stores the owner user name in association with the card ID, with which user authentication has been performed, in the card information stored in the card information storage unit 330 (S204). Upon completion of updating the owner user name in the card information, the information update control unit 314 notifies the authentication request unit 111 of the completion.

The authentication request unit 111 displays updating of the owner user name in the card information of the card ID with which user authentication has been performed, and the process ends (S205). In S205, the authentication request unit 111 displays, for example, "yamada" as the owner user name of the card ID "123003" together with the card ID on the display panel 104.

Figure 16:
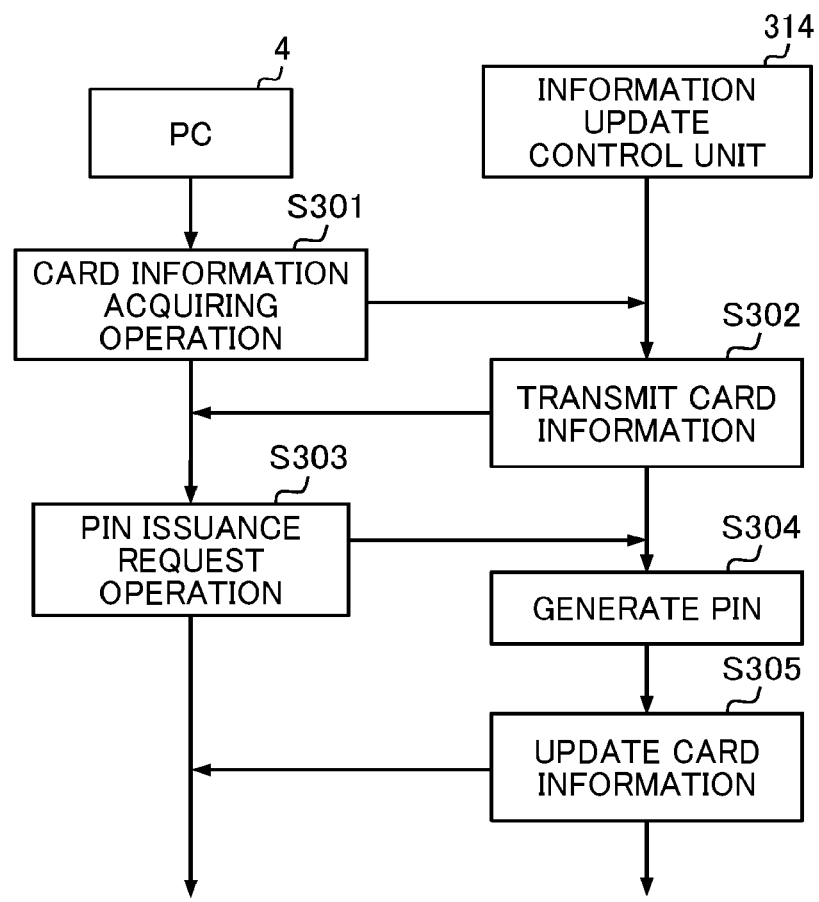
FIG. 16 is a sequence diagram illustrating process flow for generating a PIN after issuance of a card according to the embodiment of the present invention.

Next, a process for issuing a PIN will be described with reference to FIG. 16. FIG. 16 is a sequence diagram illustrating process flow for issuing a PIN according to this embodiment. Note that the process described with reference to FIG. 16 may be performed after an IC card has been issued, in other words, after card information including the card ID of the IC card has been stored in the card information storage unit 330.

In accordance with a user operation, the PC 4 transmits, to the information update control unit 314, a request of card information in which the card attribute is "guest" (S301). The information update control unit 314 refers to the card information storage unit 330 to acquire the card information in which the card attribute is "guest", and transmits the acquired card information to the PC 4 (S302).

The PC 4 causes the card information to be displayed on the display such as the LCD 60. The user specifies, for example, the card ID "678003" in the card information displayed on the LCD 60 and performs a PIN issuance request operation for issuing the PIN of the card information in which the card ID is "678003". In accordance with the PIN issuance request operation performed by the user, the PC 4 transmits a PIN issuance request (S303).

In accordance with the PIN issuance request received form the PC 4, the information update control unit 314 generates a PIN represented as a character string "XXXX" for the card information in which the card ID is "678003" (S304). Subsequently, the information update control unit 314 updates the card information in which the card ID is "678003" such that the generated PIN represented as "XXXX" is included (S305). Thus, the information update control unit 314 serves as a character string information generating unit.

Upon updating of the card information, the information update control unit 314 notifies the PC 4 of the card information in which the card ID is "678003", and the process ends. In this case, the PC 4 that is notified of the updating of the card information from the information update control unit 314 may display the generated PIN and the card ID.

In addition, the information update control unit 314 may acquire, from the user information storage unit 320, an email address that is stored in association with a user name for which the same value is set as the owner user name in the card information and may transmit the generated PIN to the acquired email address.

In this manner, in the information processing system 1 according to this embodiment, the PIN is generated in response to the request from the PC 4. In addition, as described above, this process may be performed after the card information including the card ID of the IC card has been stored in the card information storage unit 330.

Accordingly, by issuing a PIN for a user having an issued IC card whose card attribute is "guest", the authority to use the image processing apparatus 2 can be expanded to be substantially the same as that in a case where the card attribute is "employee".

Figure 17:
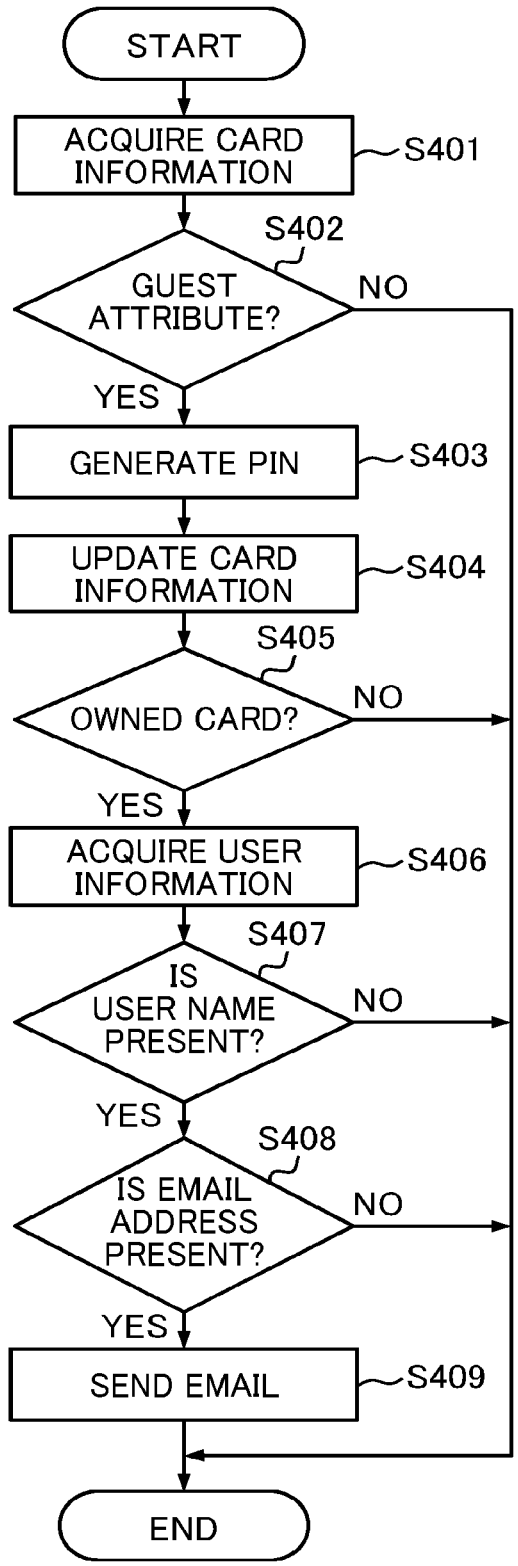
FIG. 17 is a flowchart illustrating process flow for notification of a PIN generated after issuance of a card according to the embodiment of the present invention.

Note that the process for issuing a PIN may also be performed in the server 3 on a regular basis. FIG. 17 is a flowchart illustrating process flow for issuing a PIN in the server 3 according to this embodiment.

The process described with reference to FIG. 17 is a process performed at regular timing such as on Mondays or at the start of a month. First, at regular timing such as on Mondays or at the start of a month, the information update control unit 314 acquires card information stored in the card information storage unit 330 (S401).

The information update control unit 314 determines whether each card attribute of the acquired card information is "guest" (S402). Next, for a card whose card attribute is "guest" (S402/YES), the information update control unit 314 issues a unique PIN (S403).

It is assumed in S403 that the information update control unit 314 issues a PIN represented as "YYYY" for a card whose card ID is "678001". In this case, the information update control unit 314 updates the card information in which the card ID is "678001" such that the generated PIN represented as "YYYY" is included (S404).

Subsequently, the information update control unit 314 determines whether a value corresponding to a user name has been set as "owner user name" included in the card information of the card (S405). For example, in the card information in which the card ID is "678001", the value of card attribute is "guest", and the value of owner user name is "mori".

Accordingly, the information update control unit 314 determines that a value corresponding to a user name has been set in the card information in which the card ID is "678001" (S405/YES). Subsequently, the information update control unit 314 acquires identification information from the user information storage unit 320 (S406). Subsequently, the information update control unit 314 determines whether there is identification information including a user name whose value is the same as the value of the owner user name in the card information (S407). Thus, the user information storage unit 320 serves as a notification address information storage unit.

If there is identification information including a user name whose value is the same as the value of the owner user name in the card information (S407/YES), the information update control unit 314 determines whether there is an email address that is stored in association with the user name in the identification information (S408).

If there is an email address that is stored in association with the user name in the identification information (S408/YES), the information update control unit 314 acquires the email address and transmits the PIN generated in S403 to the acquired email address (S409), and the process ends. Thus, the information update control unit 314 serves as a notification unit.

In this manner, in the information processing system 1 according to this embodiment, the PIN is generated on a regular basis. In addition, this process is performed after the card information including the card ID of the IC card has been stored in the card information storage unit 330.

In addition, by issuing a PIN on a regular basis for a user having an issued IC card whose card attribute is "guest", the PIN may be updated for use in application. Furthermore, since the user for whom the PIN has been issued is notified of the PIN, it is unlikely that other users or guests know the PIN.

As described above, the information processing system 1 according to this embodiment allows the user who is authenticated by user authentication to use the functions installed in the image processing apparatus 2, and also changes, in accordance with the user's attribute, the functions installed in the image processing apparatus 2 that are available by the authenticated user. Therefore, the image processing apparatus 2 can be used with high convenience with the security level maintained.

In typical cases, it is not possible to change the authority that is set for a card after the card has been issued. Accordingly, in those cases, the card itself is reissued to use functions of the image processing apparatus other than available functions in the authority that is set for the card. In contrast, as described above, according to one or more embodiments of the present invention, it is possible to change the authority that is set for the card with the security level maintained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
   one or more memories to store, for each user of one or more users, a card identifier (ID) assigned to the user in association with character string information to change authority of the user to use one or more functions of an image processing apparatus; and
   one or more processors configured to
      acquire a particular card ID via a network,
      acquire particular character string information via the network,
      authenticate the acquired particular card ID when the acquired particular card ID matches one of the card IDs stored in the one or more memories, and
      when the acquired particular character string information matches the character string information that is associated with the authenticated particular card ID, grant authority to use one or more particular functions of the image processing apparatus to the user to whom the authenticated particular card ID is assigned, to cause the image processing apparatus to control starting of software that implements the one or more particular functions in accordance with the granted authority,
   wherein the one or more memories further store, for each user of the one or more users, attribute information indicating a function for which the authority to use is granted, in association with the card ID, the attribute information including at least one of a first attribute and a second attribute, and
   wherein, when the second attribute is stored as the attribute information in association with the authenticated particular card ID, the one or more processors are further configured to grant the authority in accordance with the attribute information of the second attribute, to the user to whom the authenticated particular card ID is assigned.

2. The information processing system according to claim 1, further comprising:
   an information processing apparatus; and
   the image processing apparatus,
   the one or more processors including a first processor that resides on the information processing apparatus and a second processor that resides on the image processing apparatus,
   wherein the first processor of the information processing apparatus is configured to acquire authority information that is assigned to the authenticated particular card ID and that indicates the authority to use the one or more particular functions of the image processing apparatus, and
   wherein the second processor of the image processing apparatus is configured to acquire the authority information and control starting of the software that implements the one or more particular functions in accordance with the authority information.

3. The information processing system according to claim 2,
   wherein the first processor is further configured to generate the character string information, and store, in the one or more memories, the generated character string information and the card ID in association with each other.

4. The information processing system according to claim 3,
   wherein, when the one or more memories do not store the character string information that is associated with the authenticated particular card ID, the first processor is further configured to generate the character string information.

5. The information processing system according to claim 1,
   wherein the one or more processors are further configured to
      store, in the one or more memories, for each one of the one or more users, attribute information indicating a function for which the authority to use is granted, in association with the card ID, and
      when a first attribute is stored as the attribute information in association with the authenticated particular card ID and the acquired particular character string information matches the character string information that is associated with the authenticated particular card ID, grant the authority in accordance with the attribute information of a second attribute, to the user to whom the authenticated particular card ID is assigned.

6. The information processing system according to claim 1,
   wherein the one or more memories further store, for each one of the one or more users, attribute information indicating a function for which the authority to use is granted, in association with the card ID, and
   wherein, when a first attribute is stored as the attribute information in association with the authenticated particular card ID and the acquired particular character string information does not match character string information that is associated with the authenticated particular card ID, the one or more processors are further configured to grant the authority in accordance with the attribute information of the first attribute, to the user to whom the authenticated particular card ID is assigned.

7. The information processing system according to claim 3,
   wherein the information processing apparatus includes a local memory to store notification address information of the user to whom the card ID is assigned, and
   wherein the second processor is further configured to notify, by using the notification address information, a user of the authority information, the user being the user to whom the card ID is assigned, the card ID being stored in association with the generated character string information.

8. The information processing system according to claim 2,
   wherein the one or more memories further store, for each user of the one or more users, name information indicating a name of the user to whom the card ID is assigned, in association with the card ID, and wherein the one or more processors are further configured to store, in the one or more memories, particular name information that has been input from the image processing apparatus, in association with the card ID, when name information of a user to whom the authority is granted is yet to be registered.

9. An information processing apparatus communicably connected to an image processing apparatus, comprising:

a memory that stores, for each user of one or more users, a card identifier (ID) assigned to the user and character string information to change authority of the user to use one or more functions of the image processing apparatus, in association with each other; and processing circuitry configured to:
acquire a particular card ID via a network;
acquire particular character string information via the network;
authenticate the acquired particular card ID when the acquired particular card ID corresponds to one of the card IDs stored in the memory; and
when the acquired particular character string information matches the character string information that is associated with the authenticated particular card ID, grant authority to use one or more particular functions of the image processing apparatus to the user to whom the authenticated particular card ID is assigned, to cause the image processing apparatus to control starting of software that implements the one or more particular functions in accordance with the granted authority, wherein the memory further stores, for each user of the one or more users, attribute information indicating a function for which the authority to use is granted, in association with the card ID, the attribute information including at least one of a first attribute and a second attribute, and wherein, when the second attribute is stored as the attribute information in association with the authenticated particular card ID, the one or more processors are further configured to grant the authority in accordance with the attribute information of the second attribute, to the user to whom the authenticated particular card ID is assigned.

10. An information processing method, comprising:

storing, in a memory, for each user of one or more users, a card identifier (ID) assigned to the user and character string information to change authority of the user to use one or more particular functions of an image processing apparatus, in association with each other;

acquiring a particular card ID via a network;

acquiring particular character string information via the network;

authenticating the acquired particular card ID when the acquired particular card ID corresponds to one of the card IDs stored in the memory;

determining whether the acquired particular character string information matches the character string information that is associated with the authenticated particular card ID; and granting authority to use one or more functions of the image processing apparatus to the user to whom the authenticated particular card ID is assigned, to cause the image processing apparatus to control starting of software that implements the one or more particular functions in accordance with the granted authority, when the determining in the determining step, that the acquired particular character string information matches the character string information that is associated with the authenticated particular card ID, wherein the memory further stores, for each user of the one or more users, attribute information indicating a function for which the authority to use is granted, in association with the card ID, the attribute information including at least one of a first attribute and a second attribute, and wherein, when the second attribute is stored as the attribute information in association with the authenticated particular card ID, the granting step further comprises granting the authority in accordance with the attribute information of the second attribute, to the user to whom the authenticated particular card ID is assigned.

* * * * *